US008706916B2

(12) United States Patent
Ramchandran

(10) Patent No.: US 8,706,916 B2
(45) Date of Patent: Apr. 22, 2014

(54) ADAPTABLE DATAPATH FOR A DIGITAL PROCESSING SYSTEM

(71) Applicant: Altera Corporation, San Jose, CA (US)

(72) Inventor: Amit Ramchandran, San Jose, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/768,346

(22) Filed: Feb. 15, 2013

(65) Prior Publication Data

US 2013/0227182 A1 Aug. 29, 2013

Related U.S. Application Data

(63) Continuation of application No. 13/042,391, filed on Mar. 7, 2011, now Pat. No. 8,380,884, which is a continuation of application No. 12/556,894, filed on Sep. 10, 2009, now Pat. No. 7,904,603, which is a continuation of application No. 11/800,577, filed on May 3, 2007, now Pat. No. 7,606,943, which is a continuation of application No. 10/626,833, filed on Jul. 23, 2003, now abandoned.

(60) Provisional application No. 60/422,063, filed on Oct. 28, 2002.

(51) Int. Cl.
*G06F 3/00* (2006.01)

(52) U.S. Cl.
USPC .................. 710/4; 710/2; 712/33; 712/201

(58) Field of Classification Search
None
See application file for complete search history.

(56) References Cited

U.S. PATENT DOCUMENTS 3,409,175 A   11/1968   Byrne
3,666,143 A   5/1972    Weston
3,938,639 A   2/1976    Birrell
3,949,903 A   4/1976    Benasutti et al.
3,960,298 A   6/1976    Birrell
3,967,062 A   6/1976    Dobias
3,991,911 A   11/1976   Shannon et al.

(Continued)

FOREIGN PATENT DOCUMENTS

DE   100 18 374 A1   10/2001
EP   0 301 169 A1   2/1989

(Continued)

OTHER PUBLICATIONS

Abnous et al., "Ultra-Low-Power Domain-Specific Multimedia Processors," VLSI Signal Processing, IX, 1998, IEEE Workshop in San Francisco, CA, USA, Oct. 30-Nov. 1, 1998, pp. 461-470 (Oct. 30, 1998).

(Continued)

*Primary Examiner* — Idriss N Alrobaye
*Assistant Examiner* — Dayton Lewis-Taylor
(74) *Attorney, Agent, or Firm* — Nixon Peabody LLP

(57) ABSTRACT

The present invention includes an adaptable high-performance node (RXN) with several features that enable it to provide high performance along with adaptability. A preferred embodiment of the RXN includes a run-time configurable data path and control path. The RXN supports multi-precision arithmetic including 8, 16, 24, and 32 bit codes. Data flow can be reconfigured to minimize register accesses for different operations. For example, multiply-accumulate operations can be performed with minimal, or no, register stores by reconfiguration of the data path. Predetermined kernels can be configured during a setup phase so that the RXN can efficiently execute, e.g., Discrete Cosine Transform (DCT), Fast-Fourier Transform (FFT) and other operations. Other features are provided.

36 Claims, 3 Drawing Sheets

(56) References Cited

U.S. PATENT DOCUMENTS

| | | |
|---|---|---|
| 3,995,441 A | 12/1976 | McMillin |
| 4,076,145 A | 2/1978 | Zygiel |
| 4,143,793 A | 3/1979 | McMillin et al. |
| 4,172,669 A | 10/1979 | Edelbach |
| 4,174,872 A | 11/1979 | Fessler |
| 4,181,242 A | 1/1980 | Zygiel et al. |
| RE30,301 E | 6/1980 | Zygiel |
| 4,218,014 A | 8/1980 | Tracy |
| 4,222,972 A | 9/1980 | Caldwell |
| 4,237,536 A | 12/1980 | Enclow et al. |
| 4,252,253 A | 2/1981 | Shannon |
| 4,302,775 A | 11/1981 | Widergren et al. |
| 4,333,587 A | 6/1982 | Fessler et al. |
| 4,354,613 A | 10/1982 | Desai et al. |
| 4,377,246 A | 3/1983 | McMillin et al. |
| 4,393,468 A | 7/1983 | New |
| 4,413,752 A | 11/1983 | McMillin et al. |
| 4,458,584 A | 7/1984 | Annese et al. |
| 4,466,342 A | 8/1984 | Basile et al. |
| 4,475,448 A | 10/1984 | Shoaf et al. |
| 4,509,690 A | 4/1985 | Austin et al. |
| 4,520,950 A | 6/1985 | Jeans |
| 4,549,675 A | 10/1985 | Austin |
| 4,553,573 A | 11/1985 | McGarrah |
| 4,560,089 A | 12/1985 | McMillin et al. |
| 4,577,782 A | 3/1986 | Fessler |
| 4,578,799 A | 3/1986 | Scholl et al. |
| RE32,179 E | 6/1986 | Sedam et al. |
| 4,633,386 A | 12/1986 | Terepin et al. |
| 4,658,988 A | 4/1987 | Hassell |
| 4,694,416 A | 9/1987 | Wheeler et al. |
| 4,711,374 A | 12/1987 | Gaunt et al. |
| 4,713,755 A | 12/1987 | Worley, Jr. et al. |
| 4,719,056 A | 1/1988 | Scott |
| 4,726,494 A | 2/1988 | Scott |
| 4,747,516 A | 5/1988 | Baker |
| 4,748,585 A | 5/1988 | Chiarulli et al. |
| 4,760,525 A | 7/1988 | Webb |
| 4,760,544 A | 7/1988 | Lamb |
| 4,765,513 A | 8/1988 | McMillin et al. |
| 4,766,548 A | 8/1988 | Cedrone et al. |
| 4,781,309 A | 11/1988 | Vogel |
| 4,800,492 A | 1/1989 | Johnson et al. |
| 4,811,214 A | 3/1989 | Nosenchuck et al. |
| 4,824,075 A | 4/1989 | Holzboog |
| 4,827,426 A | 5/1989 | Patton et al. |
| 4,850,269 A | 7/1989 | Hancock et al. |
| 4,856,684 A | 8/1989 | Gerstung |
| 4,901,887 A | 2/1990 | Burton |
| 4,921,315 A | 5/1990 | Metcalfe et al. |
| 4,930,666 A | 6/1990 | Rudick |
| 4,932,564 A | 6/1990 | Austin et al. |
| 4,936,488 A | 6/1990 | Austin |
| 4,937,019 A | 6/1990 | Scott |
| 4,960,261 A | 10/1990 | Scott et al. |
| 4,961,533 A | 10/1990 | Teller et al. |
| 4,967,340 A | 10/1990 | Dawes |
| 4,974,643 A | 12/1990 | Bennett et al. |
| 4,982,876 A | 1/1991 | Scott |
| 4,993,604 A | 2/1991 | Gaunt et al. |
| 5,007,560 A | 4/1991 | Sassak |
| 5,021,947 A | 6/1991 | Campbell et al. |
| 5,040,106 A | 8/1991 | Maag |
| 5,044,171 A | 9/1991 | Farkas |
| 5,090,015 A | 2/1992 | Dabbish et al. |
| 5,129,549 A | 7/1992 | Austin |
| 5,139,708 A | 8/1992 | Scott |
| 5,156,301 A | 10/1992 | Hassell et al. |
| 5,156,871 A | 10/1992 | Goulet et al. |
| 5,165,575 A | 11/1992 | Scott |
| 5,190,083 A | 3/1993 | Gupta et al. |
| 5,190,189 A | 3/1993 | Zimmer et al. |
| 5,193,151 A | 3/1993 | Jain |
| 5,193,718 A | 3/1993 | Hassell et al. |
| 5,202,993 A | 4/1993 | Tarsy et al. |
| 5,203,474 A | 4/1993 | Haynes |
| 5,240,144 A | 8/1993 | Feldman |
| 5,261,099 A | 11/1993 | Bigo et al. |
| 5,263,509 A | 11/1993 | Cherry et al. |
| 5,269,442 A | 12/1993 | Vogel |
| 5,280,711 A | 1/1994 | Motta et al. |
| 5,297,400 A | 3/1994 | Benton et al. |
| 5,301,100 A | 4/1994 | Wagner |
| 5,303,846 A | 4/1994 | Shannon |
| 5,335,276 A | 8/1994 | Thompson et al. |
| 5,339,428 A | 8/1994 | Burmeister et al. |
| 5,343,716 A | 9/1994 | Swanson et al. |
| 5,361,362 A | 11/1994 | Benkeser et al. |
| 5,368,198 A | 11/1994 | Goulet |
| 5,379,343 A | 1/1995 | Grube et al. |
| 5,381,546 A | 1/1995 | Servi et al. |
| 5,381,550 A | 1/1995 | Jourdenais et al. |
| 5,388,212 A | 2/1995 | Grube et al. |
| 5,392,960 A | 2/1995 | Kendt et al. |
| 5,437,395 A | 8/1995 | Bull et al. |
| 5,450,557 A | 9/1995 | Kopp et al. |
| 5,454,406 A | 10/1995 | Rejret et al. |
| 5,465,368 A | 11/1995 | Davidson et al. |
| 5,479,055 A | 12/1995 | Eccles |
| 5,490,165 A | 2/1996 | Blakeney, II et al. |
| 5,491,823 A | 2/1996 | Ruttenberg |
| 5,507,009 A | 4/1996 | Grube et al. |
| 5,515,519 A | 5/1996 | Yoshioka et al. |
| 5,517,600 A | 5/1996 | Shimokawa |
| 5,519,694 A | 5/1996 | Brewer et al. |
| 5,522,070 A | 5/1996 | Sumimoto |
| 5,530,964 A | 6/1996 | Alpert et al. |
| 5,534,796 A | 7/1996 | Edwards |
| 5,542,265 A | 8/1996 | Rutland |
| 5,553,755 A | 9/1996 | Bonewald et al. |
| 5,555,417 A | 9/1996 | Odnert et al. |
| 5,560,028 A | 9/1996 | Sachs et al. |
| 5,560,038 A | 9/1996 | Haddock |
| 5,570,587 A | 11/1996 | Kim |
| 5,572,572 A | 11/1996 | Kawan et al. |
| 5,590,353 A | 12/1996 | Sakakibara et al. |
| 5,594,657 A | 1/1997 | Cantone et al. |
| 5,600,810 A | 2/1997 | Ohkami |
| 5,600,844 A | 2/1997 | Shaw et al. |
| 5,602,833 A | 2/1997 | Zehavi |
| 5,603,043 A | 2/1997 | Taylor et al. |
| 5,607,083 A | 3/1997 | Vogel et al. |
| 5,608,643 A | 3/1997 | Wichter et al. |
| 5,611,867 A | 3/1997 | Cooper et al. |
| 5,623,545 A | 4/1997 | Childs et al. |
| 5,625,669 A | 4/1997 | McGregor et al. |
| 5,626,407 A | 5/1997 | Westcott |
| 5,630,206 A | 5/1997 | Urban et al. |
| 5,635,940 A | 6/1997 | Hickman et al. |
| 5,646,544 A | 7/1997 | Iadanza |
| 5,646,545 A | 7/1997 | Trimberger et al. |
| 5,647,512 A | 7/1997 | Assis Mascarenhas de Oliveira et al. |
| 5,667,110 A | 9/1997 | McCann et al. |
| 5,684,793 A | 11/1997 | Kiema et al. |
| 5,684,980 A | 11/1997 | Casselman |
| 5,687,236 A | 11/1997 | Moskowitz et al. |
| 5,694,613 A | 12/1997 | Suzuki |
| 5,694,794 A | 12/1997 | Jerg et al. |
| 5,699,328 A | 12/1997 | Ishizaki et al. |
| 5,701,482 A | 12/1997 | Harrison et al. |
| 5,704,053 A | 12/1997 | Santhanam |
| 5,706,191 A | 1/1998 | Bassett et al. |
| 5,706,976 A | 1/1998 | Purkey |
| 5,712,996 A | 1/1998 | Schepers |
| 5,720,002 A | 2/1998 | Wang |
| 5,721,693 A | 2/1998 | Song |
| 5,721,854 A | 2/1998 | Ebcioglu et al. |
| 5,732,563 A | 3/1998 | Bethuy et al. |
| 5,734,808 A | 3/1998 | Takeda |
| 5,737,631 A | 4/1998 | Trimberger |
| 5,742,180 A | 4/1998 | DeHon et al. |
| 5,742,821 A | 4/1998 | Prasanna |
| 5,745,366 A | 4/1998 | Highma et al. |

(56) References Cited

U.S. PATENT DOCUMENTS

| | | |
|---|---|---|
| RE35,780 E | 5/1998 | Hassell et al. |
| 5,751,295 A | 5/1998 | Becklund et al. |
| 5,754,227 A | 5/1998 | Fukuoka |
| 5,758,261 A | 5/1998 | Wiedeman |
| 5,768,561 A | 6/1998 | Wise |
| 5,778,439 A | 7/1998 | Trimberger et al. |
| 5,784,636 A | 7/1998 | Rupp |
| 5,787,237 A | 7/1998 | Reilly |
| 5,790,817 A | 8/1998 | Asghar et al. |
| 5,791,517 A | 8/1998 | Avital |
| 5,791,523 A | 8/1998 | Oh |
| 5,794,062 A | 8/1998 | Baxter |
| 5,794,067 A | 8/1998 | Kadowaki |
| 5,802,055 A | 9/1998 | Krein et al. |
| 5,818,603 A | 10/1998 | Motoyama |
| 5,822,308 A | 10/1998 | Weigand et al. |
| 5,822,313 A | 10/1998 | Malek et al. |
| 5,822,360 A | 10/1998 | Lee et al. |
| 5,828,858 A | 10/1998 | Athanas et al. |
| 5,829,085 A | 11/1998 | Jerg et al. |
| 5,835,753 A | 11/1998 | Witt |
| 5,838,165 A | 11/1998 | Chatter |
| 5,845,815 A | 12/1998 | Vogel |
| 5,860,021 A | 1/1999 | Klingman |
| 5,862,961 A | 1/1999 | Motta et al. |
| 5,870,427 A | 2/1999 | Tiedemann, Jr. et al. |
| 5,873,045 A | 2/1999 | Lee et al. |
| 5,881,106 A | 3/1999 | Cartier |
| 5,884,284 A | 3/1999 | Peters et al. |
| 5,886,537 A | 3/1999 | Macias et al. |
| 5,887,174 A | 3/1999 | Simons et al. |
| 5,889,816 A | 3/1999 | Agrawal et al. |
| 5,890,014 A | 3/1999 | Long |
| 5,892,900 A | 4/1999 | Ginter et al. |
| 5,892,961 A | 4/1999 | Trimberger |
| 5,894,473 A | 4/1999 | Dent |
| 5,901,884 A | 5/1999 | Goulet et al. |
| 5,903,886 A | 5/1999 | Heimlich et al. |
| 5,907,285 A | 5/1999 | Toms et al. |
| 5,907,580 A | 5/1999 | Cummings |
| 5,910,733 A | 6/1999 | Bertolet et al. |
| 5,912,572 A | 6/1999 | Graf, III |
| 5,913,172 A | 6/1999 | McCabe et al. |
| 5,917,852 A | 6/1999 | Butterfield et al. |
| 5,920,801 A | 7/1999 | Thomas et al. |
| 5,931,918 A | 8/1999 | Row et al. |
| 5,933,642 A | 8/1999 | Greenbaum et al. |
| 5,933,855 A | 8/1999 | Rubinstein |
| 5,940,438 A | 8/1999 | Poon et al. |
| 5,949,415 A | 9/1999 | Lin et al. |
| 5,950,011 A | 9/1999 | Albrecht et al. |
| 5,950,131 A | 9/1999 | Vilmur |
| 5,951,674 A | 9/1999 | Moreno |
| 5,953,322 A | 9/1999 | Kimball |
| 5,956,518 A | 9/1999 | DeHon et al. |
| 5,956,967 A | 9/1999 | Kim |
| 5,959,811 A | 9/1999 | Richardson |
| 5,959,881 A | 9/1999 | Trimberger et al. |
| 5,963,048 A | 10/1999 | Harrison et al. |
| 5,966,534 A | 10/1999 | Cooke et al. |
| 5,970,254 A | 10/1999 | Cooke et al. |
| 5,987,105 A | 11/1999 | Jenkins et al. |
| 5,987,611 A | 11/1999 | Freund |
| 5,991,302 A | 11/1999 | Berl et al. |
| 5,991,308 A | 11/1999 | Fuhrmann et al. |
| 5,993,739 A | 11/1999 | Lyon |
| 5,999,734 A | 12/1999 | Willis et al. |
| 6,005,943 A | 12/1999 | Cohen et al. |
| 6,006,249 A | 12/1999 | Leong |
| 6,016,395 A | 1/2000 | Mohamed |
| 6,021,186 A | 2/2000 | Suzuki et al. |
| 6,021,492 A | 2/2000 | May |
| 6,023,742 A | 2/2000 | Ebeling et al. |
| 6,023,755 A | 2/2000 | Casselman |
| 6,028,610 A | 2/2000 | Deering |
| 6,036,166 A | 3/2000 | Olson |
| 6,039,219 A | 3/2000 | Bach et al. |
| 6,041,322 A | 3/2000 | Meng et al. |
| 6,041,970 A | 3/2000 | Vogel |
| 6,046,603 A | 4/2000 | New |
| 6,047,115 A | 4/2000 | Mohan et al. |
| 6,052,600 A | 4/2000 | Fette et al. |
| 6,055,314 A | 4/2000 | Spies et al. |
| 6,056,194 A | 5/2000 | Kolls |
| 6,059,840 A | 5/2000 | Click, Jr. |
| 6,061,580 A | 5/2000 | Altschul et al. |
| 6,073,132 A | 6/2000 | Gehman |
| 6,076,174 A | 6/2000 | Freund |
| 6,078,736 A | 6/2000 | Guccione |
| 6,085,740 A | 7/2000 | Ivri et al. |
| 6,088,043 A | 7/2000 | Kelleher et al. |
| 6,091,263 A | 7/2000 | New et al. |
| 6,091,765 A | 7/2000 | Pietzold, III et al. |
| 6,094,065 A | 7/2000 | Tavana et al. |
| 6,094,726 A | 7/2000 | Gonion et al. |
| 6,111,893 A | 8/2000 | Volftsun et al. |
| 6,111,935 A | 8/2000 | Hughes-Hartogs |
| 6,115,751 A | 9/2000 | Tam et al. |
| 6,120,551 A | 9/2000 | Law et al. |
| 6,122,670 A | 9/2000 | Bennett et al. |
| 6,138,693 A | 10/2000 | Matz |
| 6,141,283 A | 10/2000 | Bogin et al. |
| 6,150,838 A | 11/2000 | Wittig et al. |
| 6,154,494 A | 11/2000 | Sugahara et al. |
| 6,157,997 A | 12/2000 | Oowaki et al. |
| 6,175,854 B1 | 1/2001 | Bretscher |
| 6,175,892 B1 | 1/2001 | Sazzad et al. |
| 6,181,981 B1 | 1/2001 | Varga et al. |
| 6,185,418 B1 | 2/2001 | MacLellan et al. |
| 6,192,070 B1 | 2/2001 | Poon et al. |
| 6,192,255 B1 | 2/2001 | Lewis et al. |
| 6,192,388 B1 | 2/2001 | Cajolet |
| 6,195,788 B1 | 2/2001 | Leaver et al. |
| 6,198,924 B1 | 3/2001 | Ishii et al. |
| 6,199,181 B1 | 3/2001 | Rechef et al. |
| 6,202,130 B1 | 3/2001 | Scales, III et al. |
| 6,219,697 B1 | 4/2001 | Lawande et al. |
| 6,219,756 B1 | 4/2001 | Kasamizugami |
| 6,219,780 B1 | 4/2001 | Lipasti |
| 6,223,222 B1 | 4/2001 | Fijolek et al. |
| 6,226,387 B1 | 5/2001 | Tewfik et al. |
| 6,230,307 B1 | 5/2001 | Davis et al. |
| 6,237,029 B1 | 5/2001 | Master et al. |
| 6,246,883 B1 | 6/2001 | Lee |
| 6,247,125 B1 | 6/2001 | Noel-Baron et al. |
| 6,249,251 B1 | 6/2001 | Chang et al. |
| 6,258,725 B1 | 7/2001 | Lee et al. |
| 6,263,057 B1 | 7/2001 | Silverman |
| 6,266,760 B1 | 7/2001 | DeHon et al. |
| 6,272,579 B1 | 8/2001 | Lentz et al. |
| 6,281,703 B1 | 8/2001 | Furuta et al. |
| 6,282,627 B1 | 8/2001 | Wong et al. |
| 6,289,375 B1 | 9/2001 | Knight et al. |
| 6,289,434 B1 | 9/2001 | Roy |
| 6,289,488 B1 | 9/2001 | Dave et al. |
| 6,292,822 B1 | 9/2001 | Hardwick |
| 6,292,827 B1 | 9/2001 | Raz |
| 6,292,830 B1 | 9/2001 | Taylor et al. |
| 6,301,653 B1 | 10/2001 | Mohamed et al. |
| 6,305,014 B1 | 10/2001 | Roediger et al. |
| 6,311,149 B1 | 10/2001 | Ryan et al. |
| 6,321,985 B1 | 11/2001 | Kolls |
| 6,346,824 B1 | 2/2002 | New |
| 6,347,346 B1 | 2/2002 | Taylor |
| 6,349,394 B1 | 2/2002 | Brock et al. |
| 6,353,841 B1 | 3/2002 | Marshall et al. |
| 6,356,994 B1 | 3/2002 | Barry et al. |
| 6,359,248 B1 | 3/2002 | Mardi |
| 6,360,256 B1 | 3/2002 | Lim |
| 6,360,259 B1 | 3/2002 | Bradley |
| 6,360,263 B1 | 3/2002 | Kurtzberg et al. |
| 6,363,411 B1 | 3/2002 | Dugan et al. |
| 6,366,999 B1 | 4/2002 | Drabenstott et al. |
| 6,377,983 B1 | 4/2002 | Cohen et al. |

(56) References Cited

U.S. PATENT DOCUMENTS

| | | |
|---|---|---|
| 6,378,072 B1 | 4/2002 | Collins et al. |
| 6,381,735 B1 | 4/2002 | Hunt |
| 6,385,751 B1 | 5/2002 | Wolf |
| 6,405,214 B1 | 6/2002 | Meade, II |
| 6,408,039 B1 | 6/2002 | Ito |
| 6,410,941 B1 | 6/2002 | Taylor et al. |
| 6,411,612 B1 | 6/2002 | Halford et al. |
| 6,421,372 B1 | 7/2002 | Bierly et al. |
| 6,421,809 B1 | 7/2002 | Wuytack et al. |
| 6,430,624 B1 | 8/2002 | Jamtgaard et al. |
| 6,433,578 B1 | 8/2002 | Wasson |
| 6,434,590 B1 | 8/2002 | Blelloch et al. |
| 6,438,737 B1 | 8/2002 | Morelli et al. |
| 6,456,996 B1 | 9/2002 | Crawford, Jr. et al. |
| 6,459,883 B2 | 10/2002 | Subramanian et al. |
| 6,473,609 B1 | 10/2002 | Schwartz et al. |
| 6,507,947 B1 | 1/2003 | Schreiber et al. |
| 6,510,138 B1 | 1/2003 | Pannell |
| 6,510,510 B1 | 1/2003 | Garde |
| 6,538,470 B1 | 3/2003 | Langhammer et al. |
| 6,556,044 B2 | 4/2003 | Langhammer et al. |
| 6,563,891 B1 | 5/2003 | Eriksson et al. |
| 6,570,877 B1 | 5/2003 | Kloth et al. |
| 6,577,678 B2 | 6/2003 | Scheuermann |
| 6,587,684 B1 | 7/2003 | Hsu et al. |
| 6,590,415 B2 | 7/2003 | Agrawal et al. |
| 6,601,086 B1 | 7/2003 | Howard et al. |
| 6,601,158 B1 | 7/2003 | Abbott et al. |
| 6,604,085 B1 | 8/2003 | Kolls |
| 6,606,529 B1 | 8/2003 | Crowder, Jr. et al. |
| 6,615,333 B1 | 9/2003 | Hoogerbrugge et al. |
| 6,618,434 B2 | 9/2003 | Heidari-Bateni et al. |
| 6,640,304 B2 | 10/2003 | Ginter et al. |
| 6,653,859 B2 | 11/2003 | Sihlbom et al. |
| 6,662,260 B1 | 12/2003 | Wertheim et al. |
| 6,675,265 B2 | 1/2004 | Barroso et al. |
| 6,691,148 B1 | 2/2004 | Zinky et al. |
| 6,711,617 B1 | 3/2004 | Bantz et al. |
| 6,718,182 B1 | 4/2004 | Kung |
| 6,721,286 B1 | 4/2004 | Williams et al. |
| 6,721,884 B1 | 4/2004 | De Oliveira Kastrup Pereira et al. |
| 6,732,354 B2 | 5/2004 | Ebeling et al. |
| 6,735,621 B1 | 5/2004 | Yoakum et al. |
| 6,738,744 B2 | 5/2004 | Kirovski et al. |
| 6,748,360 B2 | 6/2004 | Pitman et al. |
| 6,754,470 B2 | 6/2004 | Hendrickson et al. |
| 6,760,587 B2 | 7/2004 | Holtzman et al. |
| 6,766,165 B2 | 7/2004 | Sharma et al. |
| 6,778,212 B1 | 8/2004 | Deng et al. |
| 6,785,341 B2 | 8/2004 | Walton et al. |
| 6,819,140 B2 | 11/2004 | Yamanaka et al. |
| 6,823,448 B2 | 11/2004 | Roth et al. |
| 6,829,633 B2 | 12/2004 | Gelfer et al. |
| 6,832,250 B1 | 12/2004 | Coons et al. |
| 6,836,839 B2 | 12/2004 | Master et al. |
| 6,865,664 B2 | 3/2005 | Budrovic et al. |
| 6,871,236 B2 | 3/2005 | Fishman et al. |
| 6,883,084 B1 | 4/2005 | Donohoe |
| 6,894,996 B2 | 5/2005 | Lee |
| 6,901,440 B1 | 5/2005 | Bimm et al. |
| 6,912,515 B2 | 6/2005 | Jackson et al. |
| 6,985,517 B2 | 1/2006 | Matsumoto et al. |
| 6,986,021 B2 | 1/2006 | Master et al. |
| 6,988,139 B1 | 1/2006 | Jervis et al. |
| 7,032,229 B1 | 4/2006 | Flores et al. |
| 7,044,741 B2 | 5/2006 | Leem |
| 7,082,456 B2 | 7/2006 | Mani-Meitav et al. |
| 7,139,910 B1 | 11/2006 | Ainsworth et al. |
| 7,142,731 B1 | 11/2006 | Toi |
| 7,249,242 B2 | 7/2007 | Ramchandran |
| 2001/0003191 A1 | 6/2001 | Kovacs et al. |
| 2001/0023482 A1 | 9/2001 | Wray |
| 2001/0029515 A1 | 10/2001 | Mirsky |
| 2001/0034795 A1 | 10/2001 | Moulton et al. |
| 2001/0039654 A1 | 11/2001 | Miyamoto |
| 2001/0048713 A1 | 12/2001 | Medlock et al. |
| 2001/0048714 A1 | 12/2001 | Jha |
| 2001/0050948 A1 | 12/2001 | Ramberg et al. |
| 2002/0010848 A1 | 1/2002 | Kamano et al. |
| 2002/0013799 A1 | 1/2002 | Blaker |
| 2002/0013937 A1 | 1/2002 | Ostanevich et al. |
| 2002/0015435 A1 | 2/2002 | Rieken |
| 2002/0015439 A1 | 2/2002 | Kohli et al. |
| 2002/0023210 A1 | 2/2002 | Tuomenoksa et al. |
| 2002/0024942 A1 | 2/2002 | Tsuneki et al. |
| 2002/0024993 A1 | 2/2002 | Subramanian et al. |
| 2002/0031166 A1 | 3/2002 | Subramanian et al. |
| 2002/0032551 A1 | 3/2002 | Zakiya |
| 2002/0035623 A1 | 3/2002 | Lawande et al. |
| 2002/0041581 A1 | 4/2002 | Aramaki |
| 2002/0042907 A1 | 4/2002 | Yamanaka et al. |
| 2002/0061741 A1 | 5/2002 | Leung et al. |
| 2002/0069282 A1 | 6/2002 | Reisman |
| 2002/0072830 A1 | 6/2002 | Hunt |
| 2002/0078337 A1 | 6/2002 | Moreau et al. |
| 2002/0083305 A1 | 6/2002 | Renard et al. |
| 2002/0083423 A1 | 6/2002 | Ostanevich et al. |
| 2002/0087829 A1 | 7/2002 | Snyder et al. |
| 2002/0089348 A1 | 7/2002 | Langhammer |
| 2002/0101909 A1 | 8/2002 | Chen et al. |
| 2002/0107905 A1 | 8/2002 | Roe et al. |
| 2002/0107962 A1 | 8/2002 | Richter et al. |
| 2002/0119803 A1 | 8/2002 | Bitterlich et al. |
| 2002/0120672 A1 | 8/2002 | Butt et al. |
| 2002/0138716 A1 | 9/2002 | Master et al. |
| 2002/0141489 A1 | 10/2002 | Imaizumi |
| 2002/0147845 A1 | 10/2002 | Sanchez-Herrero et al. |
| 2002/0159503 A1 | 10/2002 | Ramachandran |
| 2002/0162026 A1 | 10/2002 | Neuman et al. |
| 2002/0168018 A1 | 11/2002 | Scheuermann |
| 2002/0181559 A1 | 12/2002 | Heidari-Bateni et al. |
| 2002/0184291 A1 | 12/2002 | Hogenauer |
| 2002/0184498 A1 | 12/2002 | Qi |
| 2002/0191790 A1 | 12/2002 | Anand et al. |
| 2002/0199090 A1 | 12/2002 | Wilson |
| 2003/0007606 A1 | 1/2003 | Suder et al. |
| 2003/0012270 A1 | 1/2003 | Zhou et al. |
| 2003/0018446 A1 | 1/2003 | Makowski et al. |
| 2003/0018700 A1 | 1/2003 | Giroti et al. |
| 2003/0023830 A1 | 1/2003 | Hogenauer |
| 2003/0026242 A1 | 2/2003 | Jokinen et al. |
| 2003/0030004 A1 | 2/2003 | Dixon et al. |
| 2003/0046421 A1 | 3/2003 | Horvitz et al. |
| 2003/0061260 A1 | 3/2003 | Rajkumar |
| 2003/0061311 A1 | 3/2003 | Lo |
| 2003/0063656 A1 | 4/2003 | Rao et al. |
| 2003/0076815 A1 | 4/2003 | Miller et al. |
| 2003/0099223 A1 | 5/2003 | Chang et al. |
| 2003/0102889 A1 | 6/2003 | Master et al. |
| 2003/0105949 A1 | 6/2003 | Master et al. |
| 2003/0110485 A1 | 6/2003 | Lu et al. |
| 2003/0142818 A1 | 7/2003 | Raghunathan et al. |
| 2003/0154357 A1 | 8/2003 | Master et al. |
| 2003/0163723 A1 | 8/2003 | Kozuch et al. |
| 2003/0172138 A1 | 9/2003 | McCormack et al. |
| 2003/0172139 A1 | 9/2003 | Srinivasan et al. |
| 2003/0200538 A1 | 10/2003 | Ebeling et al. |
| 2003/0212684 A1 | 11/2003 | Meyer et al. |
| 2004/0006584 A1 | 1/2004 | Vandeweerd |
| 2004/0010645 A1 | 1/2004 | Scheuermann et al. |
| 2004/0015970 A1 | 1/2004 | Scheuermann |
| 2004/0025159 A1 | 2/2004 | Scheuermann et al. |
| 2004/0057505 A1 | 3/2004 | Valio |
| 2004/0062300 A1 | 4/2004 | McDonough et al. |
| 2004/0081248 A1 | 4/2004 | Parolari |
| 2004/0093479 A1 | 5/2004 | Ramchandran |
| 2004/0168044 A1 | 8/2004 | Ramchandran |
| 2005/0166038 A1 | 7/2005 | Wang et al. |
| 2005/0198199 A1 | 9/2005 | Dowling |
| 2006/0031660 A1 | 2/2006 | Master et al. |

(56) References Cited

U.S. PATENT DOCUMENTS

FOREIGN PATENT DOCUMENTS

| | | |
|---|---|---|
| EP | 0 166 586 B1 | 1/1991 |
| EP | 0 236 633 B1 | 5/1991 |
| EP | 0 478 624 B1 | 4/1992 |
| EP | 0 479 102 A2 | 4/1992 |
| EP | 0 661 831 A2 | 7/1995 |
| EP | 0 668 659 A2 | 8/1995 |
| EP | 0 690 588 A2 | 1/1996 |
| EP | 0 691 754 A2 | 1/1996 |
| EP | 0 768 602 A2 | 4/1997 |
| EP | 0 817 006 A2 | 1/1998 |
| EP | 0 821 495 A2 | 1/1998 |
| EP | 0 866 210 A2 | 9/1998 |
| EP | 0 923 247 A2 | 6/1999 |
| EP | 0 926 596 A2 | 6/1999 |
| EP | 1 056 217 A2 | 11/2000 |
| EP | 1 061 437 A1 | 12/2000 |
| EP | 1 061 443 A2 | 12/2000 |
| EP | 1 126 368 A2 | 8/2001 |
| EP | 1 150 506 A2 | 10/2001 |
| EP | 1 189 358 A1 | 3/2002 |
| GB | 2 067 800 A | 7/1987 |
| GB | 2 237 908 A | 5/1991 |
| JP | 62-249456 | 10/1987 |
| JP | 63-147258 | 6/1988 |
| JP | 4-51546 | 2/1992 |
| JP | 7-064789 | 3/1995 |
| JP | 7066718 | 3/1995 |
| JP | 10233676 | 9/1998 |
| JP | 10254696 | 9/1998 |
| JP | 11296345 | 10/1999 |
| JP | 2000315731 | 11/2000 |
| JP | 2001-053703 | 2/2001 |
| WO | WO 89/05029 A1 | 6/1989 |
| WO | WO 89/11443 A2 | 11/1989 |
| WO | WO 91/00238 A1 | 1/1991 |
| WO | WO 93/13603 A1 | 7/1993 |
| WO | WO 95/11855 A1 | 5/1995 |
| WO | WO 96/33558 A1 | 10/1996 |
| WO | WO 98/32071 A3 | 7/1998 |
| WO | WO 99/03776 A1 | 1/1999 |
| WO | WO 99/21094 A2 | 4/1999 |
| WO | WO 99/26860 A1 | 6/1999 |
| WO | WO 99/65818 A1 | 12/1999 |
| WO | WO 00/19311 A1 | 4/2000 |
| WO | WO 00/65855 A1 | 11/2000 |
| WO | WO 00/69073 A1 | 11/2000 |
| WO | WO 01/11281 A1 | 2/2001 |
| WO | WO 01/22235 A1 | 3/2001 |
| WO | WO 01/76129 A2 | 10/2001 |
| WO | WO 02/12978 A2 | 2/2002 |

OTHER PUBLICATIONS

Aggarwal et al.., "Efficient Huffman Decoding," International Conference on Image Processing IEEE 1:936-939 (Sep. 10-13, 2000).
Allan et al., "Software Pipelining," ACM Computing Surveys, 27(3):1-78 (Sep. 1995).
Alsolaim et al., "Architecture and Application of a Dynamically Reconfigurable Hardware Array for Future Mobile Communication Systems," Field Programmable Custom Computing Machines, 2000 IEEE Symposium, Napa Valley, Los Alamitos, CA. IEEE Comput. Soc. pp. 205-214 (Apr. 17-19, 2000).
Ashenden et al., "The VHDL Cookbook," Dept. Computer Science, University of Adelaide, South Australia. Downloaded from http://tams-www.informatik.uni-hamburg.de/vhdl/doc/cookbook/VHDL-Cookbook.pdf on Dec. 7, 2006 (Jul. 1990).
Bacon et al., "Compiler Transformations for High-Performance Computing," ACM Computing Surveys 26(4):368-373 (Dec. 1994).
Balasubramonian et al., "Reducing the Complexity of the Register File in Dynamic Superscalar Processors," Proceedings of the 34th Annual ACM/IEEE International Symposium on Microarchitecture, pp. 237-248 (Dec. 1, 2001).

Banerjee ct al., "A MATLAB Compiler for Distributed, Heterogeneous, Reconfigurable Computing Systems," 2000 IEEE Symposium, pp. 39-48, (Apr. 17-19, 2000).
Bapte et al., "Uniform Execution Environment for Dynamic Reconfiguration," Darpa Adaptive Computing Systems, http://isis.vanderbilt.edu/publications/archive/babty_T_#_0_1999_Uniform_Ex.pdf, pp. 1-7 (1999).
Baumgarte et al., "PACT XPP—A Self-Reconfigurable Data Processing Architecture," NN www.pactcorp.com/sneu/download/ersa01.pdf; retrieved on Nov. 25, 2005 (Jun. 25, 2001).
Becker et al., "An Application-Tailored Dynamically Reconfigurable Hardware Architecture for Digital Baseband Processing," IEEE Conference Proceedings Article pp. 341-346 (Sep. 18, 2000).
Becker et al., "Design and Implementation of a Coarse-Grained Dynamically Reconfigurable Hardware Architecture," VLSI 2001, Proceedings IEEE Computer Soc. Workshop, Piscataway, NJ, USA, pp. 41-46 (Apr. 19-20, 2001).
Bevstar, BevStar Bottled Water Model Advertisement *Automatic Merchandiser* at www.AMonline.com (2005).
Bevstar, BevStar Point of Use Water Model Advertisement *Automatic Merchandiser* at www.AMonline.com (2005).
Bishop & Loucks, "A Heterogeneous Environment for Hardware/Software Cosimulation," Proceedings of the 30th Annual Simulation Symposium, pp. 14-22 (Apr. 7-9, 1997).
Brakensiek et al., "Re-Configurable Multi-Standard Terminal for Heterogeneous Networks," Radio and Wireless Conference, Rawcon 2002 IEEE. pp. 27-30 (2002).
Brown et al., "Quick PDA Data Exchange," PC Magazine pp. 1-3 (May 22, 2001).
Buck et al., "Ptolemy: A Framework for Simulating and Prototyping Heterogeneous Systems," International Journal of Computer Simulation 4:155-182 (Apr. 1994).
Burns et al., "A Dynamic Reconfiguration Run-Time System," Proceedings of the 5th Annual Symposium on Field-Programmable Custom Computing Machines, pp. 166-175 (Apr. 16, 1997).
Business Wire, "Whirlpool Internet-Enabled Appliances to Use Beeline Shopper Software Features," http://www.whirlpoocorp.com/news/releases/release.asp?rid=90 (Feb. 16, 2001).
Buttazzo et al., "Optimal Deadline Assignment for Scheduling Soft Aperiodic Tasks in Hard Real-Time Environments," Engineering of Complex Computer Systems, Proceedings of the Third IEEE International Conference on Como, pp. 39-48 (Sep. 8, 1997).
Callaiian et al., "Adapting Software Pipelining for Reconfigurable Computing," in Proceedings of the International Conference on Compilers, Architectrue and Synthesis for Embedded Systems p. 8, ACM (Cases '00, San Jose, CA) (Nov. 17-18, 2000).
Chapman & Mehrotra, "OpenMP and HPF: Integrating Two Paradigms," Proceedings of the 4th International Euro-Par Conference (Euro-Par'98), Springer-Verlag Heidelberg, Lecture Notes in Computer Science 1470:650-658 (1998).
Chen et al., "A Reconfigurable Multiprocessor IC for Rapid Prototyping of Algorithmic-Specific High-Speed DSP Data Paths," IEEE Journal of Solid-State Circuits, IEEE 35:74-75 (Feb. 1, 2001).
Clarke, "Embedded Solutions Enters Development Pact with Marconi," EETimes Online (Jan. 26, 2000).
Compton & Hauck, "Reconfigurable Computing: A Survey of Systems and Software," ACM Press, ACM Computing Surveys (CSUR) 34(2):171-210 (Jun. 2002).
Compton et al., "Configuration Relocation and Defragmentation for Run-Time Reconfigurable Computing," Northwestern University, http://citeseer.nj.nec.com/compton00configuration.html, pp. 1-17 (2000).
Conte et al., "Dynamic Rescheduling: A Technique for Object Code Compatibility in VLIW Architectures," Proceedings of the 28th Annulal International Symposium on Microarchitecture pp. 208-218 (Nov. 29, 1995).
Conte et al., "Instruction Fetch Mechanisms for VLIW Architectures with Compressed Encodings," Proceedings of the Annual IEEE/ACM International Symposium on Microarchitecture (MICRO) 29:201-211 (Dec. 2, 1996).
Cray Research Inc., "Cray T3E Fortran Optimization Guide," Ver. 004-2518-002, Section 4.5 (Jan. 1999).

(56) References Cited

OTHER PUBLICATIONS

Cummings et al., "FPGA in the Software Radio," IEEE Communications Magazine . 37(2):108-112 (Feb. 1999).
Dandalis et al., "An Adaptive Cryptograhic Engine for IPSec Architectures," IEEE pp. 132-141 (Jan. 2000).
David et al., "DART: A Dynamically Reconfigurable Architecture Dealing with Future Mobile Telecommunication Constraints," Proceedings of the International Parallel and Distributed Processing Symposium pp. 156-163 (Apr. 15, 2002).
Deepakumara et al., "FPGA Implementation of MD5 has Algorithm," Canadian Conference on Electrical and Computer Engineering, IEEE (2001).
Dehon et al., "Reconfigurable Computing: What, Why and Implications for Design Automation," Design Automation Conference Proceedings pp. 610-615 (1999).
Dipert, "Figuring Out Reconfigurable Logic," EDN 44(16):107-114 (Aug. 5, 1999).
Dominikus, "A Hardware Implementation of MD4-Family Hash Algorithms," 9th International Conference on Electronics, Circuits and Systems IEEE (2002).
Dorband, "aCe C Language Reference Guide," Online (Archived Mar. 2001), http://web.archive.org/web/20000616053819/http://newton.gsfc.nasa.gov/aCe/aCe_dir/aCe_cc_Ref.html (Mar. 2001).
Drozdowski, "Scheduling Multiprocessor Tasks—An Overview," Instytut Informatyki Politechnika, pp. 1-31 (Jan. 31, 1996).
Ebeling et al., "RaPiD Reconfigurable Pipelined Datapath," Springer-Verlag, 6th International Workshop on Field-Programmable Logic and Applications pp. 126-135 (1996).
Fawer et al., "A Multiprocessor Approach for Implementing a Time-Diversity Spread Specturm Receiver," Proceeding sof the 1990 International Zurich Seminal on Digital Communications, pp. 173-180 (Mar. 5-8, 1990).
Fisher, "Gone Flat," Forbes pp. 76-79 (Oct. 2001).
Fleischmann et al., "Prototyping Networked Embedded Systems," Integrated Engineering, pp. 116-119 (Feb. 1999).
Forbes "Best of the Web—Computer Networking/Consumer Durables," *The Forbes Magnetic 40* p. 80 (May 2001).
Gibson, "Fresh Technologies Will Create Myriad Functions," FT Information Technology Review; World Wide Web at http://technews.acm.org/articles/2000-2/0301w.
html?searchterm=%22fresh+technologies%22 (Mar. 1, 2000).
Gluth, "Integrierte Signalprozessoren," Elektronik 35(18):112-118 Franzis Verlag GmbH, Munich, Germany (Sep. 5, 1986).
Gokhale & Schlesinger, "A Data Parallel C and Its Platforms," Proceedings of the Fifth Symposium on the Frontiers of Massively Parallel Computation pp. 194-202 (Frontiers '95) (Feb. 1995).
Grimm et al., "A System Architecture for Pervasive Computing," Washington University, pp. 1-6 (Sep. 2000).
Halbwachs et al., "The Synchronous Data Flow Programming Language LUSTRE," Proceedings of the IEEE 79(9):1305-1319 (Sep. 1991).
Hammes et al., "Cameron: High Level Language Compilation for Reconfigurable Systems," Proc. of the Intl. Conf. on Parallel Architectures and Compilation Techniques, pp. 236-244 (Oct. 1999).
Hartenstein, "Coarse Grain Reconfigurable Architectures," Design Automation Conference, 2001. Proceedings of the ASP-Dac 2001, Asian and South Pacific Jan. 30, 2001-Feb. 2, 2001, Piscataway, NJ, US, IEEE, pp. 564-569 (Jan. 30, 2001).
Heinz, "An Efficiently Compilable Extension of {M} odula-3 for Problem-Oriented Explicitly Parallel Programming," Proceedings of the Joint Symposium on Parallel Processing (May 1993).
Hinden et al., "The DARPA Internet: Interconnecting Heterogeneous Computer Networks with Gateways," IEEE Computer Magazine pp. 38-48 (1983).
Horton, "Beginning Java 2: JDK 1.3 Edition," Wrox Press, Chapter 8, pp. 313-316 (Feb. 2001).
Huff et al., "Lifetime-Sensitive Modulo Scheduling," 6th Conference on Programming Language, Design and Implementation, pp. 258-267, ACM (1993).
IBM, "Multisequencing a Single Instruction Stream Scheduling with Space-time Tradeoffs," IBM Technical Disclosure Bulletin 36(2):105-108 (Feb. 1, 1993).
IEEE, "IEEE Standard Verilog Hardware Description Language," downloaded from http://inst.eecs.berkeley.edu/~cs150/fa06/Labs/verilog-ieee.pdf on Dec. 7, 2006 (Sep. 2001).
Internet Wire, Sunbeam Joins Microsoft in University Plug and Play Forum to Establish A "Universal" Smart Appliance Technology Standard (Mar. 23, 2000).
Ishii et al., "Parallel Variable Length Decoding with Inverse Quantization for Software MPEG-2 Decoders," Workshop on Signal Processing Systems, Design and Implementation, IEEE pp. 500-509 (Nov. 3-5, 1997).
Isoworth, "Isoworth Beverage Dispensing Technology Worldwide Company," Brochure (May 22, 2000).
Jain et al., "An Alternative Approach Towards the Design of Control Units," Microelectronics and Reliability 24(6):1009-1012 (1984).
Jain, "Parallel Processing with the TMS320C40 Parallel Digital Signal Processor," Sonitech International Inc., pp. 13-46. Retrieved from: http://www-s.ti.com/sc/psheets/spra031/spra031.pdf retrieved on Apr. 14, 2004 (Feb. 1994).
Janssen et al., "Partitioned Register File for TTAs," Proceedings of the 28th Annual International Symposium on Microarchitecture, pp. 303-312 (Nov. 1995).
Jong-Pyng et al., "Real-Time Virtual Channel Flow Control," Proceedings of the Annual International Phoenix Conference on Computers and Communications, Conf. 13, pp. 97-103 (Apr. 12, 1994).
Jung et al., "Efficient Hardware Controller Synthesis for Synchronous Dataflow Graph in System Level Design," Proceedings of the 13th International Symposium on System Synthesis pp. 79-84 (ISSS'00) (Sep. 2000).
Kaufmann et al., "Digital Spread-Spectrum Multipath-Diversity Receiver for Indoor Communication," from Pioneers to the 21st Century; Denver, Proceedings of the Vehicular Technology Socity [sic] Conference, NY, IEEE, US 2(Conf. 42):1038-1041 (May 10-13, 1992).
Kneip et al., "An Algorithm Adapted Autonomous Controlling Concept for a Parallel Single-Chip Digital Signal Processor," Journal of VLSI Signal Processing Systems for Signal, Image, an dVideo Technology 16(1):31-40 (May 1, 1997).
Lee & Messerschmitt, "Pipeline Interleaved Programmable DSP's: Synchronous Data Flow Programming," IEEE Transactions on Acoustics, Speech, and Signal Processing ASSP-35(9):1334-1345 (Sep. 1987).
Lee & Messerschmitt, "Synchronous Data Flow," Proceedings of the IEEE 75(9):1235-1245 (Sep. 1987).
Lee & Parks, "Dataflow Process Networks," Proceedings of the IEEE 83(5):773-799 (May 1995).
Liu et al., "Scheduling Algorithms for Multiprogramming in a Hard-Real-Time Environment," *Journal of the Association for Computing* 20(1):46-61 (1973).
Llosa et al., "Lifetime-Sensitive Modulo Scheduling in a Production Environment," IEEE Trans. on Comps. 50(3):234-249 (Mar. 2001).
Lu et al., "The Morphosys Dynamically Reconfigurable System-On-Chip," Proceedings of the First NASA/DOD Workshop on Evolvable Hardware, pp. 152-160 (Jul. 19, 1999).
Mangione-Smith et al., "Seeking Solutions in Configurable Computing," Computer 30(12):38-43 (Dec. 1997).
Manion, "Network CPU Adds Spice," Electronic Engineering Times, Issue 1126 (Aug. 14, 2000).
Mascia & Ishii., "Neural Net Implementation on Single-Chip Digital Signal Processor," IEEE (1989).
McGraw, "Parallel Functional Programming in Sisal: Fictions, Facts, and Future," Lawrence Livermore National Laboratory pp. 1-40 (Jul. 1993).
Najjar et al., "High-Level Language Abstraction for Reconfigurable Computing," *Computer* 36(8):63-69 (Aug. 2003).
Nichols et al., "Data Management and Control-Flow Constructs in a SIMD/SPMD Parallel Language/Compiler," Proceedings of the 3rd Symposium on the Frontiers of Massively Parallel Computation pp. 397-406 (Oct. 1990).
Openmp Architecture Review Board, "OpcnMP C and C++ Application Program Interface," pp. 7-16 (Oct. 1998).

(56) References Cited

OTHER PUBLICATIONS

Oracle Corporation, "Oracle8i JDBC Developer's Guide and Reference," Release 3, 8.1.7, pp. 10-8-10-10 (Jul. 2000).
Pauer et al., "Algorithm Analysis and Mapping Environment for Adaptive Computing Systems: Further Results," Proc. IEEE Symposium on FPGA's for Custom Computing Machines (FCCM), Napa CA (1999).
Pauer et al., "Algorithm Analysis and Mapping Environment for Adaptive Computing Systems," Presentation slides, Third Bi-annual Ptolemy Miniconference (1999).
Ratvlamritham et al., "On Scheduling Algorithms for Real-Time Multiprocessor Systems," Algorithms and Applications, Proceedings of the International conference on Parallel Processing 3:143-152 (Aug. 8, 1989).
Schneider, "A Parallel/Serial Trade-Off Methodology for Look-Up Table Based Decoders," Proceedings of the Design Automation Conference 34:498-503 (Jun. 9-13, 1997).
Sidhu et al., "A Self-Reconfigurable Gate Array Architecture," 10 International Workshop on Field Programmable Logic and Applications http://coblitz.codeen.org:3125/citesccr.ist.psu.edu/cache/papers/cs/17524/http:zSzzSzmaarcii.usc.eduzSzPublicationsZSzsidhu_fp100.pdf/sidhu00selfreconfigurable.pdf retrieved on Jun. 21, 2006 (Sep. 1, 2001).
Smith, "Intro to ASICs: ASIC Cell Libraries," at http://iroi.seu.edu.cn/books/asics/Book2/CH01/CH01.5.htm, printed on Feb. 4, 2005 (Jun. 1997).
Souza, "Computing's New Face—Reconfigurable Devices Could Rattle Supply Chain," Electronic Buyers' News Issue 1205, p. P.1 (Apr. 3, 2000).
Souza, "Quicksilver Buys White Eagle," Electronic Buyers News, Issue 1220 (Jul. 17, 2000).
Sriram et al., "MPEG-2 Video Decoding on the TMS320C6X DSP Architecture," Conference Record of the 32nd Asilomar Conference on Signals, Systems, and Computers, IEEE pp. 1735-1739 (Nov. 1-4, 1998).
Steiner, "Coke Chief's Latest Daft Idea—A Cola 'I'ap in Every House," Sunday Times (Mar. 2001).
Sun Microsystems, "FORTRAN 3.0.1 User's Guide, Revision A," pp. 57-68 (Aug. 1994).
Svensson, "Co's Join on Home Web Wiring Network," Associated Press Online printed on Apr. 30, 2008 (Jun. 2000).
Tang et al., "Thread Partitioning and Scheduling Based on Cost Model," Proceedings of the Ninth Annual ACM Symposium on Parallel Algorithms and Architectures, pp. 272-281 Retrieved from: http://doi.acm.org/10.1145/258492.2585 retrieved on Aug. 25, 2004 (1997).
Vaya, "VITURBO: A Reconfigurable Architecture for Ubiquitous Wireless Networks," A Thesis Submitted in Partial Fulfillment of the Requirements for the Degree Master of Science; Rice University (Aug. 2002).
Wang et al., "Cell Search in W-CDMA," IEEE Journal on Selected Areas in Communications 18(8):1470-1482 (Aug. 2000).
Wardell, "Help for Hurried Cooks?," Popular Science, p. 32 (May 2000).
Whiting & Pascoe, "A History of Data-Flow Languages," IEEE Annals of the History of Computing 16(4):38-59 (1994).
Williamson & Lee, "Synthesis of Parallel Hardware Implementations from Synchronous Dataflow Graph Specifications," Conference Record of the Thirtieth Asilomar Conference on Signals, Systems and Computers 1340-1343 (Nov. 1996).
Wirthlin et al., "A Dynamic Instruction Set Computer," Proceedings of the IEEE Symposium on FPGA's for Custom Computing Machines, pp. 99-107 (Apr. 21, 1995).
www.appliancemagazine.com, World Wide Web at http://web.archive.org/web/20000511085402/http://www.appliancemagazine.com/ printed on Apr. 30, 2008.
www.bestrom.com, BreakMateTM from www.bestrom.com printed on Apr. 29, 2008.
www.beverageexpress.com, Beverage Express from www.beverageexpress.com printed on Apr. 30, 2008.
www.bevstar.com, Isoworth Beverage Dispensing Technology Worldwide from www.bevstar.com printed on Apr. 30, 2008.
www.bonator.com, from the World Wide Web at http://web.archive.org/web/20000510102440/http://www.bonator.com/ printed on Apr. 30, 2008.
www.ecommerce.dewpointinc.com, Swiss Mountain Coffees from www.ecommerce.dewpointinc.com printed on Apr. 30, 2008.
www.gateway.com, World Wide Web, http://web.archive.org/web/20000229192734/www.gateway.com/productpages/9300splash/index.shtml Available on Mar. 3, 2000, 1 page.
www.icl.com, from the World Wide Web at http://www.icl.com printed on Apr. 30, 2008.
www.margherita2000.Com; from Margherita2000.com printed Apr. 30, 2008 (Jan. 26, 2001).
www.sodaclubenterprises.com, Soda-Club Enterprises from www.sodaclubenterprises.com printed on Apr. 30, 2008.
www.symbol.com, Symbol from www.symbol.com printed on Apr. 30, 2008.
www.wunderbar.com, Wunder-Bar Dispensing Systems from www.wunderbar.com printed on Apr. 30, 2008.
Xilinx, "Virtex-II Pro Platform FPGAs: Functional Description DS083-2 (v2.5)," Product Specification, pp. 13-46 (Jan. 20, 2003).
Young, "Architecture Powers up IPSec, SSL," EETimes, Los Gatos, CA, pp. 1-4 http://www.eetimes.com/story/OEG20011102S0065 (Nov. 2, 2001).
Yuan et al., "A Decomposition Approach to Non-Preemptive Real 'TimeScheduling," Real Time Systems 6(1):7-35 (1994).
Zaino et al., "Algorithm Analysis and Mapping Environment for Adaptive Computing Systems," Final Technical Report, DARPA Contract F33615-97-C-1174 (Sep. 2001).
Zhang et al., "A 1V Heterogeneous Reconfigurable Processor IC for Baseband Wireless Applications," 2000 IEEE Solid.
International Search Report for PCT/US03/34046 dated Mar. 23, 2005.
International Search Report for PCT/US03/34049 dated Feb. 18, 2005.
U.S. Appl. No. 10/626,833 Office Action Mailed Dec. 8, 2005.
U.S. Appl. No. 10/626,833 Office Action Mailed Jun. 23, 2006.
U.S. Appl. No. 11/800,577 Office Action Mailed May 28, 2008.
U.S. Appl. No. 11/800,577 Office Action Mailed Feb. 23, 2009.

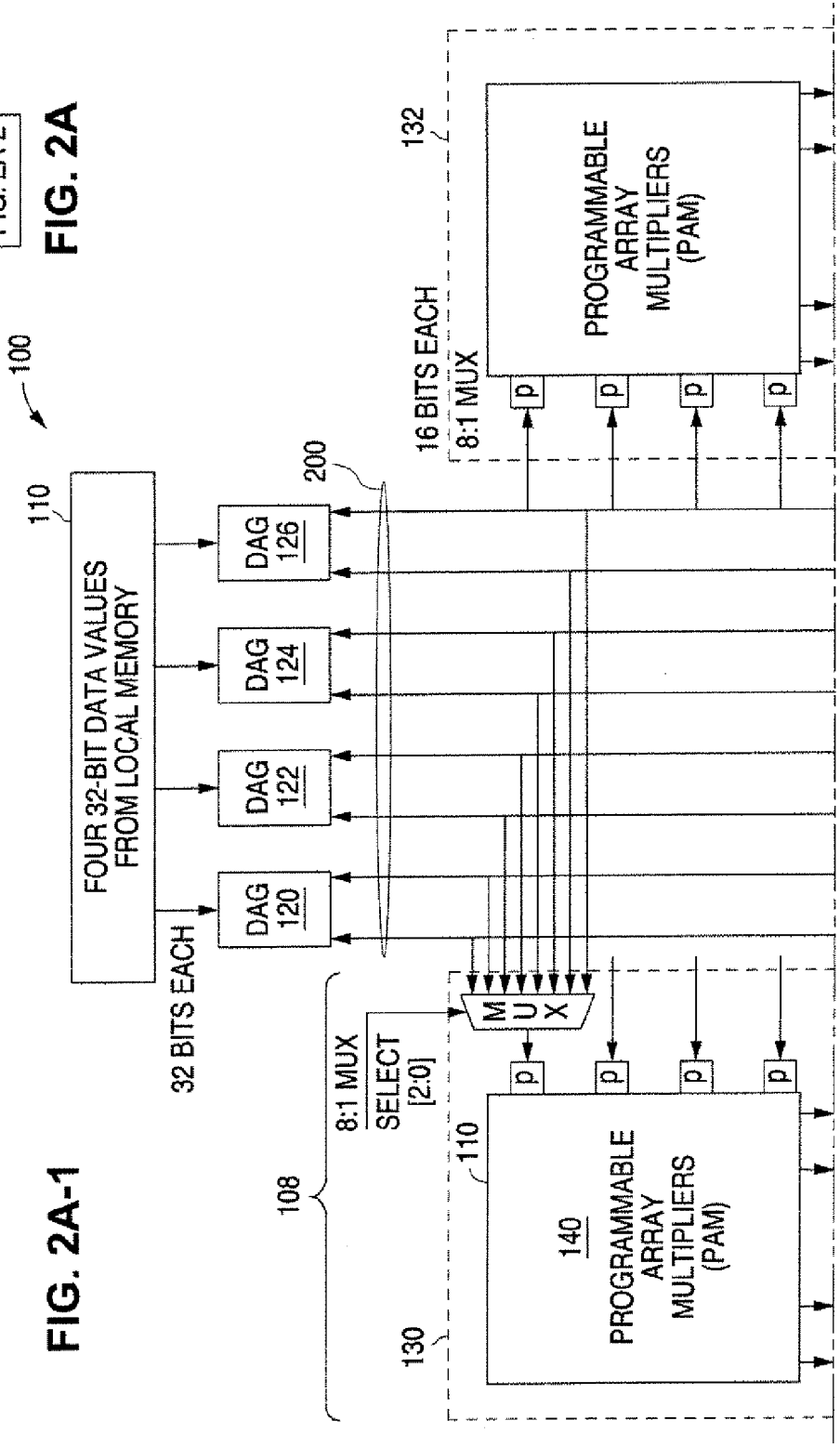

ADAPTABLE DATAPATH FOR A DIGITAL PROCESSING SYSTEM

CROSS-REFERENCE TO RELATED APPLICATIONS

This application is a continuation of U.S. application Ser. No. 11/800,577, filed May 3, 2007, which is a continuation of U.S. application Ser. No. 10/626,833, filed Jul. 23, 2003, which claims the benefit of U.S. Provisional Application No. 60/422,063, filed Oct. 28, 2002, each of the aforementioned applications are incorporated by reference herein.

This application is related to the following co-pending U.S. patent applications that are each incorporated by reference as if set forth in full in this application: "Input Pipeline Registers For A Node In An Adaptive Computing Engine," Ser. No. 10/626,479, filed Jul. 23, 2003; "Cache For Instruction Set Architecture Using Indexes To Achieve Compression", Ser. No. 11/628,083, filed Jul. 24, 2003; "Method For Ordering Operations For Scheduling By A Modulo Scheduler For Processors With A Large Number Of Function Units And Reconfigurable Data Paths", Ser. No. 10/146,857, filed on May 15, 2002; "Uniform Interface For A Functional Node In An Adaptive Computing Engine", Ser. No. 10/443,554, filed on May 21, 2003; "Hardware Task Manager For Adaptive Computing", Ser. No. 10/443,501, filed on May 21, 2003; and "Adaptive Integrated Circuitry With Heterogeneous And Reconfigurable Matrices Of Diverse And Adaptive Computational Units Having Fixed, Application Specific Computational Elements", Ser. No. 09/815,122, filed on Mar. 22, 2001.

BACKGROUND OF THE INVENTION

This invention is related in general to digital processing architectures and more specifically to the use of an adaptable data path using register files to efficiently implement digital signal processing operations.

Digital Signal Processing (DSP) calculations require many iterations of fast multiply-accumulate and other operations. Typically, the actual operations are accomplished by "functional units" such as multipliers, adders, accumulators, shifters, etc. The functional units obtain values, or operands, from a fast main memory such as Random Access Memory (RAM). The DSP system can be included within a chip that resides in a device such as a consumer electronic device, computer, etc.

The design of a DSP chip can be targeted for specific DSP applications. For example, in a cellular telephone, a DSP chip may be optimized for Time-Division Multiple Access (TDMA) processing. A Voice-Over-Internet Protocol (VoIP) application may require vocoding operations, and so on. It is desirable for a chip manufacturer to provide a single chip design that can be adapted to different DSP applications. Such a chip is often described as an adaptable, or configurable, design.

One aspect of an adaptable design for a DSP chip includes allowing flexible and configurable routing between the different functional units, memory and other components such as registers, input/output and other resources on the chip. A traditional approach to providing flexible routing uses a data bus. Such an approach is shown in FIG. 1.

In FIG. 1, memory bus 10 interfaces with a memory (not shown) to provide values from the memory to processing components such as functional unit blocks 30, 32 and 34. Values from memory bus 10 are selected and routed through memory bus interface 20 to data path bus 36. The functional unit blocks are able to obtain values from data path bus 36 by using traditional bus arbitration logic (e.g., address lines, bus busy, etc.). Within a block, such as functional unit block 30 of FIG. 1, there may be many different components, such as a bank of multipliers, to which the data from data path bus 36 can be transferred. In this manner, any arbitrary value from memory can be provided to any functional unit block, and to components within blocks of functional units.

Values can also be provided between functional unit blocks by using the data path bus. Another resource is register file 60 provided on data path bus 36 by register file interface 50. Register file 60 includes a bank of fast registers, or fast RAM. Register file interface 50 allows values from data path bus 36 to be exchanged with the register file. Typically, any register or memory location within register file 60 can be placed on data path bus 36 within the same amount of time (e.g., a single cycle). One way to do this is to provide an address to a location in the register file, either on the data path bus, itself, or by using a separate set of address lines. This approach is very flexible in that any value in a component of a functional unit block can be transferred to any location within the register file and vice versa.

However, a drawback with the approach of FIG. 1, is that such a design is rather expensive to create, slow and does not scale well. A bus approach requires considerable overhead in control circuitry and arbitration logic. This takes up real estate on the silicon chip and increases power consumption. The use of a large, randomly addressable register file also is quite costly and requires inclusion of tens of thousands of additional transistors. The use of such complicated logic often requires bus cycle times to be slower to accommodate all of the switching activity. Finally, such an approach does not scale well since, e.g., adding more and more functional unit blocks will require additional addressing capability that may mean more lines and logic. Additional register file space may also be required. The data path bus would also need to be routed to connect to the added components. Each functional unit block also requires the bus control and arbitration circuitry.

Thus, it is desirable to provide an interconnection scheme for digital processor applications that improves over one or more of the above, or other, shortcomings in the prior art.

SUMMARY OF THE INVENTION

The present invention uses dedicated groups of configurable data path lines to transfer data values from a main memory to functional units. Each group of data path lines includes a register file dedicated for storage for each group of lines. Functional units can obtain values from, and store values to, main memory and can transfer values among the registers and among other functional units by using the dedicated groups of data path lines and a data address generator (DAG).

DAG circuitry interfaces each group of datapath lines to a main memory bus. Each DAG is controllable to select a value of varying bit width from the memory bus, or to select a value from another group of data path lines. In a preferred embodiment, eight groups of 16 data path lines are used. Each group includes a register file of eight 16-bit words on each group of 16 data path lines. Registers can hold a value onto their associated group of data path lines so that the value is available at a later time on the lines without the need to do a later data fetch.

In one embodiment the invention provides a data path circuit in a digital processing device, wherein the data path circuit is coupled to a memory bus for obtaining values from a memory, the data path circuit comprising a first plurality of data lines; a first data address generator for coupling the first plurality of data lines to the memory bus so that a value from the memory transferred by the memory bus can be placed onto the first plurality of data lines; one or more functional units for performing a digital operation coupled to the plurality of data lines; and a register coupled to the first plurality of data lines, wherein the register selectively stores a value from the first plurality of data lines so that the value is selectively available on the first plurality of data lines.

Another aspect of the invention provides both general and direct data paths between array multipliers and accumulators. Banks of accumulators are coupled to the groups of configurable data path lines and are also provided with direct lines to the multipliers. An embodiment of the invention provides a digital processing system comprising a multiplier; an accumulator; a configurable data path coupled to the multiplier and the accumulator; and a direct data path coupled between the multiplier and the accumulator.

DETAILED DESCRIPTION OF THE INVENTION

A preferred embodiment of the invention is incorporated into a node referred to as a Adaptable Node (RXN) in a adaptive computing engine (ACE) manufactured by Quicksilver, Inc., of San Jose, Calif. Details of the ACE engine and RXN node can be found in the priority and related patent applications reference above. Aspects of the invention described herein are adaptable for use with any generalized digital processing system, such as a system adapted for digital signal processing or other types of processing.

Figure 1:
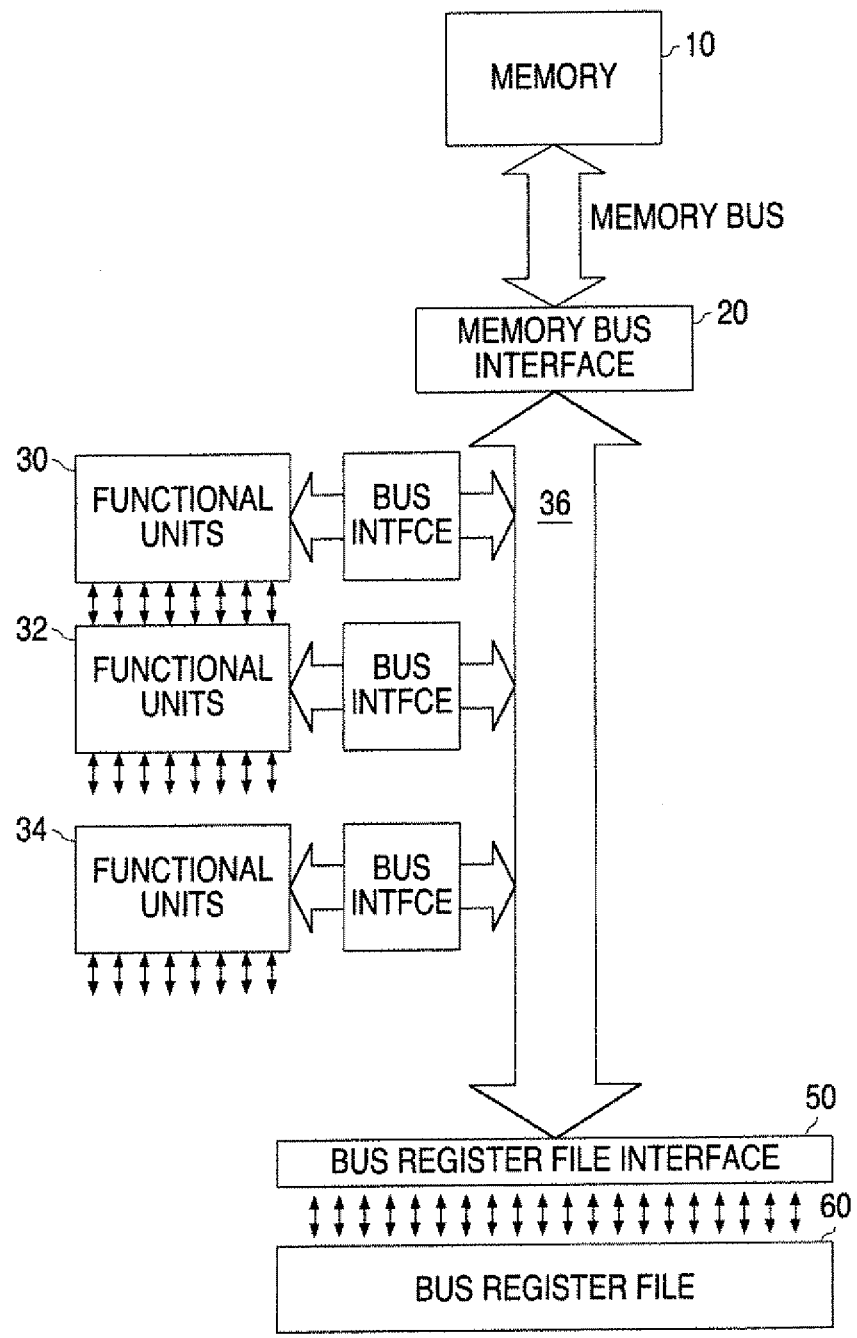
FIG. 1 shows a prior art approach using a data path bus.
Figures 2, 2A:
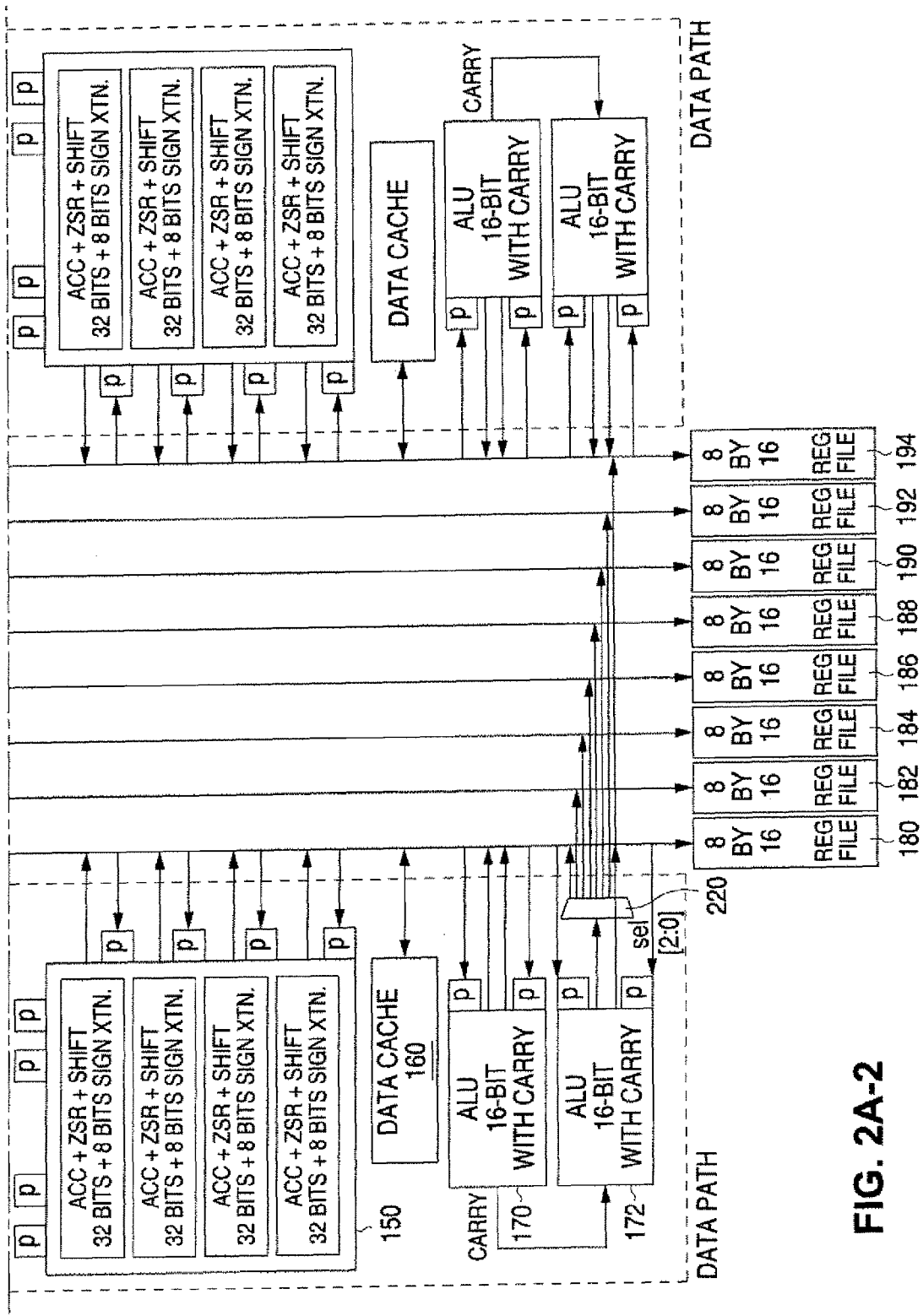
FIG. 2A comprising FIG. 2A-1 and FIG. 2A-2 illustrates the configurable data path arrangement of a preferred embodiment of the present invention.

FIG. 2A comprising FIG. 2A-1 and FIG. 2A-2 illustrates the configurable data path arrangement according to a preferred embodiment of the present invention.

In FIG. 2A, digital processing system 100 is designed for fast DSP-type processing such as in discrete cosine transformation (DCT), fast fourier transformation (FFT), etc. Digital processing system 100 includes four 32-bit data path address generators (DAG) to interface between four groups of configurable data path lines 200 and a main memory bus 110. Main memory bus 110 is an arbitrated high-speed bus as is known in the art. Other types of main memory accessing can be used.

Each group of 32 lines includes two subgroups of 16 lines each. Each subgroup is connected to a register file of eight 16-bit words. For example, DAG 120 is connected to register files 180 and 182. DAG 122 is connected to register files 184 and 186. Similarly, DAGs 124 and 126 are connected to register files 188, 190 and 192, 194, respectively. Naturally, other embodiments can use any number of DAGs, groups, and subgroups register files. Although specific bit widths, numbers of lines, components, etc., and specific connectivity are described, many variations are possible and are within the scope of the invention. Although the DAGs play a major role in the preferred embodiment, other embodiments can use other types of interfacing to the main memory bus. Although the DAGs provide a high degree of configurable routing options (as discussed below), other embodiments can vary in the degree of configurability, and in the specific configuration options and control methods. In some cases, simple registers, register files, multiplexers or other components might be used in place of the DAGs of the present invention.

The use of register files on each of the discrete subgroup lines simplifies the interconnection architecture from that of the more generalized bus and multiport register file shown in FIG. 1 of the prior art. This approach can also provide benefits in reduced transistor count, power consumption, improved scalability, efficient data access and other advantages. Although configuring the data path of the present invention may be more complex than with generalized approaches, in practice, a compiler is able to automatically handle the configuration transparently to a human programmer. This allows creation of faster-executing code for a variety of DSP applications by using the same hardware architecture without placing any undue burden on the programmer. If desired, a programmer can customize the data path configuration in order to further optimize processing execution.

Groups of data path lines 200 are used to transfer data from memory bus 110 to functional units within blocks 130 and 132, and also to transfer data among the functional units, themselves. The functional unit blocks are essentially the same so only block 130 is discussed in detail. Functional units include Programmable Array Multipliers (PAMs) 140, accumulators (and shift registers) 150, data cache 160 and Arithmetic/Logic Units (ALUs) 170 and 172. Naturally, the functional units used in any specific embodiment can vary in number and type from that shown in FIG. 2A.

Functional units are connected to the data path line groups via multiplexers and demultiplexers such as 210 and 220, respectively. Inputs and Outputs (I/Os) from the functional units can, optionally, use multiplexing to more than one subgroup of data path lines; or an I/O can be connected directly to one subgroup. A preferred embodiment uses pipeline registers between I/O ports and data path lines, as shown by boxes labeled "p" in FIG. 2A. Pipeline registers allow holding data at I/O ports, onto data lines, or for other purposes. The pipeline registers also allow obtaining a zero, 1, or other desired binary values and provide other advantages. Pipeline registers are described in more detail in the co-pending patent application "Input Pipeline Registers For A Node In An Adaptive Computing Engine" referenced above.

Table I, below, shows DAG operations. The configuration of the data path from cycle to cycle is set by a control word, or words obtained from the main memory bus in accordance with controller modules such as a hardware task manager, scheduler and other processes and components not shown in FIG. 2A but discussed in related patent applications. Part of the configuration information includes fields for DAG operations. A DAG operation can change from cycle to cycle and includes reading data of various widths from memory or from another DAG. DAG operations other than those shown in Table I can be used. Each DAG has one 5-bit 'dag-op' field and one 4-bit 'address' field. There is a single 'pred' field that defines non-sequencing operations.

TABLE I

| Dag-op | Mnemonic | Description | Cycles |
|---|---|---|---|
| 0x00 | read8 | Read 8-bits from memory | 1 |
| 0x01 | read8x | Read 8-bits from memory and sign extend to 32-bits | 1 |
| 0x02 | read16 | Read 16-bits from memory | 1 |
| 0x03 | read16x | Read 16-bits from memory and sign extend to 32-bits | 1 |
| 0x04 | read24 | Read 24-bits from memory | 1 |
| 0x05 | read24x | Read 24-bits from memory and sign extend to 32-bits | 1 |
| 0x06 | read32 | Read 32-bits from memory | 1 |
| 0x07 | write8 | Write 8-bits to memory | 1 |
| 0x08 | write16 | Write 16-bits to memory | 1 |
| 0x09 | write24 | Write 24-bits to memory | 1 |
| 0x0A | write32 | Write 32-bits to memory | 1 |
| 0x0B | writeMindp | Write 32-bits (only mode supported) to MIN write queue from the data path buses | 1 |
| 0x0C | writeMinM | Write 32-bits (only mode supported) to MIN write queue from a 32-bit memory read. | 1 (pipelined) |
| 0x0D | readdag16 | Read a 16 bit value from one DAG register | 0 |
| 0x0E | readdag32 | Read a 32 bit value from two DAG registers | 0 |
| 0x0F | load32dp | Load two 16-bit DAG registers or 32-bit write buffer using 32-bit data in dp2n:dp2n+1 connecting to DAGn | 1 |
| 0x10 | load16dpn | Load a DAG register from an even data path bus | 1 |
| 0x11 | load16dpn+1 | Load a DAG register from an odd data path bus 1 | |
| 0x12 | modify | Modify address but do not do a memory access. | 1 |
| 0x13 | Dagnoop | Do nothing. All DAG operations execute every clock cycle until this operation is chosen | 1 |
| 0x14 | Dagcont | Continue the previous operation | 1 |
| 0x15 | writePA | Writes 32-bits of data from memory into "tfrl" or "tbrl" | 1 |
| 0x16 | writeMinbuf | Write 32-bits to MIN write queue from buffer | 1 |

For dag-op: 0x00 to 0x0A, 0x0C and 0x12 the DAG operation format of Table II applies. The address field is divided into action and context as shown.

TABLE II

| 10    6 5 | 4 3 | 2 1 | 0 |
|---|---|---|---|
| dag-op | action | context | pred |
| 5 | 2 | 2 | 2 |

Action

The 'action' field describes the address modification/generation process using a set of registers (base, limit, index and delta) pointed to by the 'context' field.

TABLE 1

DAG address calculation

| action | Operation | Description |
|---|---|---|
| 00 | Supply an address and post modify | Address = Base + Index<br>Index = Index + delta (delta is a signed value)<br>If Index >= limit, Index = Index − limit<br>If Index < 0, Index = limit + Index |
| 01 | Supply a pre-modified address | Index = Index + delta (delta is a signed value)<br>If Index >= limit, Index = Index − limit<br>If Index < 0, Index = limit + Index<br>Address = Base + Index |
| 11 | Supply a bit-reversed address | Address = Base + B-Index<br>B-Index = reverse carry add (Index + delta)<br>(delta is a signed value)<br>If Index >= limit, Index = Index − Limit<br>If Index < 0, Index = limit + Index |

Context

The 'context' field is used to point at a specific DAG setting (base, limit, index and delta) on which an 'action' is performed or a DAG register is accessed (II)

TABLE 2 context encoding

| Context | Operation |
|---|---|
| 00 | Use setting—basen.0, limitn.0, indexn.0, deltan.0 for DAGn |
| 01 | Use setting—basen.1, limitn.1, indexn.1, deltan.1 for DAGn |
| 10 | Use setting—basen.2, limitn.2, indexn.2, deltan.2 for DAGn |
| 11 | Use setting—basen.3, limitn.3, indexn.3, deltan.3 for DAGn |

For convenience, an ACTION function is defined according to the action table—ACTION (action, context) where 'action' and 'context' refer to the DAG operation fields. This function is used in the individual DAG operation descriptions.

(II) For dag-op: 0x0D to 0x11 the following DAG operation format applies:

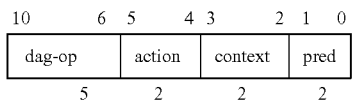

The 'dag-reg' field is used to identify a specific 16-bit register (base or limit or index or delta) within a DAG 'context' as specified by the dag-reg table (below)

TABLE 3 dag-reg encoding for dag-op 0x0D, 0x10 and 0x11

| dag-reg | Register |
|---|---|
| 00 | base |
| 01 | limit |
| 10 | index |
| 11 | delta |

For operations 0x0E and 0x0F, the dag-reg field is used to address 2 DAG registers—base and limit or index and delta or a write buffer location. In this case, the 'dag-reg' table is as follows:

TABLE 4 dag-reg encoding for dag-op 0x0E

| dag-reg | Register |
|---|---|
| 0X | Base and limit |
| 1X | Index and delta |

X—don't care

TABLE 5 dag-reg encoding for dag-op 0x0F

| dag-reg | Register |
|---|---|
| 00 | Base and limit |
| 10 | Index and delta |
| 11 | Location 'n' of write buffer for DAGn |

01— undefined (III) For dag-op: 0x0B, 0x13, 0x14, and 0x16 the following DAG operation format applies:

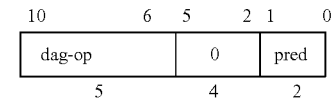

The address field in this case is unused, which is represented as "0" in the RXN.

(IV) For dag-op: 0x15 the following DAG operation format applies:

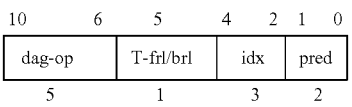

The 'T-frl/brl' field is used to choose between the translation frl and the translation brl

| T-frl/brl | Operation |
|---|---|
| 0 | The 'idx' field points to T-frl |
| 1 | The 'idx' field points to T-brl |

The T-frl and T-brl each have 5 32-bit locations. The 'idx' field is used to address these five locations

| add | Operation |
|---|---|
| 000 | Location 0 |
| 001 | Location 1 |
| 010 | Location 2 |
| 011 | Location 3 |
| 100 | Location 4 |
| 101 | Location 5 |

Pred

The universal 'pred' field along with the 's' bit determines whether a DAG operation is executed or not executed. When a DAG operation is 'not executed' due to its predication, the last executed DAG operation executes again.

TABLE 6

Pred field encoding

| Pred | Description |
|---|---|
| 00 | Never execute |
| 01 | Always execute (execute specified operations) |
| 10 | Execute if condition is true ("s" bit is set) (execute specified operation) If condition is false ("s" bit is not set) (do not execute the DAG operation) |
| 11 | Execute if condition is false ("s" bit is not set) (execute specified operation) If condition is true ("s" bit is set) (do not execute the DAG operation) |

Note:
All DAG operations execute every clock cycle until "dagnoop" operation is chosen.

Although the invention has been discussed with respect to specific embodiments thereof, these embodiments are merely illustrative, and not restrictive, of the invention. For example, although the node has been described as part of an adaptive computing machine, or environment, aspects of the filter node design, processing and functions can be used with other types of systems. In general, the number of lines and specific interconnections can vary in different embodiments. Specific components, e.g., the data address generator, can be implemented in different ways in different designs. Components may be omitted, substituted or implemented with one or more of the same or different components. For example, a data address generator can be substituted with a general register, or it can be a different component responsive to a control word. Many variations are possible.

Thus, the scope of the invention is to be determined solely by the claims.

What is claimed is:

1. A reconfigurable data path circuit coupled to a memory bus for obtaining data from a memory, the reconfigurable data path circuit comprising:
    a plurality of functional units configured to perform a digital operation;
    one or more data address generators coupled to the memory bus;
    a configurable data path configurably coupled to the one or more data address generators and the plurality of functional units, the configurable data path being configurable in response to a first configuration information to provide a data path configuration by configuring or reconfiguring interconnections between the one or more data address generators and the plurality of functional units, the data path configuration including the configured or reconfigured interconnections;
    wherein the one or more data address generators are coupled to the memory bus and the configurable data path, each of the one or more data address generators being configurable in response to a second configuration information that is different from the first configuration information to generate memory addresses from which data is to be read from or written to the memory for the data path configuration; and
    wherein the first and second configuration information include context information, the context information to provide a selectable plurality of contexts for the reconfigurable data path circuit, each context being a predetermined configuration for the reconfigurable data path circuit.

2. The reconfigurable data path circuit of claim 1, wherein the one or more data address generators are configurable for generating memory addresses for each context of the selectable plurality of contexts.

3. The reconfigurable data path circuit of claim 1, wherein each context is a predetermined configuration of each of the plurality of functional units, the configurable data path, and the one or more data address generators.

4. The reconfigurable data path circuit of claim 1, wherein each of the one or more data address generators is configurable to provide to the plurality of functional units the context information for configuring the plurality of functional units for the respective context.

5. The reconfigurable data path circuit of claim 4, wherein context registers are provided for each of the plurality of functional units for storing the context information.

6. The reconfigurable data path circuit of claim 3, wherein the one or more data address generators store the context information for their own predetermined configuration in one or more context registers.

7. The reconfigurable data path circuit of claim 1, wherein the first and second configuration information each comprises a separate control word.

8. The reconfigurable data path circuit of claim 7, wherein each separate control word includes an operation field including the context information.

9. The reconfigurable data path circuit of claim 8, wherein each control word further comprises an address field, the address field designating one of the memory addresses.

10. The reconfigurable data path circuit of claim 1, wherein the one or more data address generators are further configurable or reconfigurable in response to the second configuration information to read data of one or more widths from the memory bus consistent with and for the data path configuration and the context information.

11. The reconfigurable data path circuit of claim 1, wherein the one or more data address generators are configurable in response to the second configuration information to split data received from the memory bus onto the configurable data path.

12. The reconfigurable data path circuit of claim 10, wherein the one or more data address generators transfer data to the configurable data path for processing by the functional units in parallel.

13. The reconfigurable data path circuit of claim 1, wherein the one or more data address generators are further configurable in response to the second configuration information to read data from the memory via the memory bus, the generation of a respective memory address for the reading of the data being a function of the context information.

14. The reconfigurable data path circuit of claim 1, wherein the one or more data address generators are further configurable in response to the second configuration information to transfer data to the memory bus for writing to the memory, the generation of a respective memory address for the writing of the data being a function of the context information.

15. The reconfigurable data path circuit of claim 1, wherein the plurality of functional units include a multiplier and an accumulator, the accumulator being adapted to accumulate outputs from the multipliers into a register, the reconfigurable data path circuit further comprising a direct data path coupling the multiplier and the accumulator.

16. The reconfigurable data path circuit of claim 15, wherein the plurality of functional units further includes an Arithmetic Logic Unit (ALU).

17. The reconfigurable data path circuit of claim 1, further comprising a plurality of register files each configurably interconnected by the configurable data path to the plurality of functional units and to one of the one or more data address generators.

18. The reconfigurable data path circuit of claim 1, wherein the configurable data path further comprises a reconfigurable interconnection network configurable for configuring or reconfiguring the interconnections between or among the one or more data address generators and the plurality of functional units for the data path configuration and for each of the plurality of contexts.

19. The reconfigurable data path circuit of claim 18, wherein the reconfigurable interconnection network includes a plurality of groups of data lines configurably coupled to the one or more data address generators and the plurality of functional units.

20. The reconfigurable data path circuit of claim 19, wherein the reconfigurable interconnection network is configurable or reconfigurable to create portions of the reconfigurable data paths having different widths, the portions being coupled between the data address generators and the plurality of functional units.

21. The reconfigurable data path circuit of claim 17, wherein the configurable data path further comprises a reconfigurable interconnection network comprising a plurality of groups of data lines configurably coupled to the one or more data address generators, the functional units, and the plurality of register files in the configurable data path, each register file of the plurality of register files being coupled to a group of data lines of the plurality of groups of data lines in the configurable data path in a one-to-one correspondence, the plurality of register files adapted for storing data from the respective group of data lines to which the respective ones of the plurality of register files is coupled.

22. The reconfigurable data path circuit of claim 1, wherein the interconnections of the configurable data path and the one or more data address generators are configurable in real time.

23. The reconfigurable data path circuit of claim 1, wherein at least one of the plurality of functional units is configurable to provide at least two different functions, the at least two different functions being selectable based on the context information.

24. The reconfigurable data path circuit of claim 18, wherein the plurality of functional units are configurable to provide a second plurality of configurable data paths between respective ones of the plurality of functional units and the reconfigurable interconnection network.

25. The reconfigurable data path circuit of claim 24, wherein the second plurality of configurable data paths are configurable for a plurality of data widths.

26. The reconfigurable data path circuit of claim 1, wherein each of the functional units of the plurality of functional units comprises one of a multiplier, an accumulator, a data cache, an Arithmetic Logic Unit (ALU), or a register file.

27. The reconfigurable data path circuit of claim 26, wherein the reconfigurable data path includes the multiplier, the accumulator, the data cache, the Arithmetic Logic Unit (ALU), the register file, and the reconfigurable data path includes interconnects between or among the functional units of the reconfigurable data path.

28. The reconfigurable data path circuit of claim 1, wherein each of the data address generators is further configurable in response to the second configuration information to control memory addresses from which data is to be read from or written to the memory consistent with and for the data path configuration.

29. A digital processing system comprising:
a memory bus coupled to a memory; and
a reconfigurable data path circuit coupled to the memory bus for obtaining data from the memory, the reconfigurable data path circuit comprising:
a plurality of functional units configurable to perform a digital operation; and
one or more data address generators coupled to the memory bus;
a configurable data path configurably coupled to the one or more data address generators and the plurality of functional units, the configurable data path being configurable in response to a first configuration information to provide a data path configuration by configuring or reconfiguring interconnections between or among the one or more data address generators and the plurality of functional units, the data path configuration including the configured or reconfigured interconnections, the one or more data address generators being coupled between the memory bus and the configurable data path, each of the one or more data address generators being configurable in response to a second configuration information to generate memory addresses from which data is to be read from or written to the memory consistent with and for the data path configuration; and
wherein the first and second configuration information include context information, the context information to provide a selectable plurality of contexts for the reconfigurable data path circuit, each context being a predetermined configuration for the reconfigurable data path circuit.

30. The digital processing system of claim 29, wherein each of the data address generators is further configurable in response to the second configuration information to control memory addresses from which data is to be read from or written to the memory consistent with and for the data path configuration.

31. The digital processing system of claim 29, wherein each context is a predetermined configuration of each of the plurality of functional units, the configurable data path, and the one or more data address generators of the reconfigurable data path circuit.

32. The digital processing system of claim 29, wherein each of the one or more data address generators is configurable to provide to the plurality of functional units the context information for configuring the plurality of functional units for the respective context.

33. The digital processing system of claim 29, wherein the configurable data path further comprises a reconfigurable interconnection network configurable for configuring or reconfiguring the interconnections between or among the one or more data address generators and the plurality of functional units for the data path configuration and for each of the plurality of contexts.

34. The digital processing system of claim 33, wherein the reconfigurable interconnection network is configurable or reconfigurable to create portions of the reconfigurable data paths having different widths, the portions being coupled between the data address generators and the plurality of functional units.

35. The digital processing system of claim 29, wherein the plurality of functional units include a multiplier, an accumulator, and an Arithmetic Logic Unit (ALU), the reconfigurable data path circuit further comprising a direct data path coupling the multiplier and the accumulator.

36. The digital processing system of claim 29, wherein at least one of the plurality of functional units is configurable to provide at least two different functions, the at least two different functions being selectable based on the context information.

* * * * *